US009002626B2

United States Patent
Waltz et al.

(10) Patent No.: US 9,002,626 B2
(45) Date of Patent: *Apr. 7, 2015

(54) VEHICULAR NAVIGATION CONTROL INTERFACE

(71) Applicant: Crown Equipment Corporation, New Bremen, OH (US)

(72) Inventors: Lucas B. Waltz, Auckland (NZ); Bing Zheng, Sidney, OH (US); Thomas L. Mallak, Spencerville, OH (US); Steve Mangette, Lima, OH (US)

(73) Assignee: Crown Equipment Company, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,185

(22) Filed: Feb. 4, 2014

(65) Prior Publication Data

US 2014/0188324 A1 Jul. 3, 2014

Related U.S. Application Data

(63) Continuation of application No. 13/626,385, filed on Sep. 25, 2012, now Pat. No. 8,694,194, which is a continuation of application No. PCT/US2012/052820, filed on Aug. 29, 2012.

(60) Provisional application No. 61/528,497, filed on Aug. 29, 2011.

(51) Int. Cl.
*G06F 19/00* (2011.01)
*B66F 9/06* (2006.01)
*G05D 1/00* (2006.01)

(52) U.S. Cl.
CPC .............. *B66F 9/063* (2013.01); *G05D 1/0061* (2013.01); *G05D 2201/0216* (2013.01)

(58) Field of Classification Search
CPC ... B66F 9/07581; B66F 9/063; G05D 1/0061; G05D 2201/0216; B06B 1/08
USPC ................ 701/25, 110; 323/222, 282; 360/48
See application file for complete search history.

(56) References Cited

U.S. PATENT DOCUMENTS 3,567,048 A 3/1971 Whitham
3,942,088 A 3/1976 Yosioka et al.
(Continued)

OTHER PUBLICATIONS

Office Action pertaining to U.S. Appl. No. 13/626,385 dated May 22, 2013.

(Continued)

*Primary Examiner* — McDieunel Marc
(74) *Attorney, Agent, or Firm* — Dinsmore & Shohl LLP

(57) ABSTRACT

Systems and methods for providing a vehicular navigation control interface are included in the present disclosure. Some embodiments include a navigation system and a vehicle with a vehicle control module (VCM), a navigation control module (NCM), and a navigation control interface, where the VCM receives a manual command from an operator to implement a manual control function. In some embodiments the NCM receives an automatic command from the navigation system to implement an automatic control function via the VCM and the navigation control interface directly connects the VCM and the NCM to facilitate communication between the VCM and NCM for implementing automatic mode and for reporting implementation of a manual mode.

20 Claims, 4 Drawing Sheets

(56) References Cited

U.S. PATENT DOCUMENTS

| | | |
|---|---|---|
| 4,040,500 A | 8/1977 | Blakeslee |
| 4,077,486 A | 3/1978 | Blakeslee et al. |
| 4,083,422 A | 4/1978 | Blakeslee et al. |
| 4,279,487 A | 7/1981 | Baker et al. |
| 4,319,820 A | 3/1982 | Ostrowski et al. |
| 4,744,408 A | 5/1988 | Pearson et al. |
| 5,068,790 A | 11/1991 | Wellman |
| 5,184,122 A | 2/1993 | Decious et al. |
| 5,213,548 A | 5/1993 | Colbert et al. |
| 5,401,223 A | 3/1995 | White et al. |
| 5,557,519 A | 9/1996 | Morita |
| 5,625,558 A | 4/1997 | Togai et al. |
| 5,726,890 A | 3/1998 | Takamoto et al. |
| 5,778,327 A | 7/1998 | Simmons et al. |
| 5,778,853 A | 7/1998 | Saito |
| 5,795,264 A | 8/1998 | Steeby et al. |
| 5,938,710 A | 8/1999 | Lanza et al. |
| 5,938,711 A | 8/1999 | Steeby et al. |
| 5,995,001 A | 11/1999 | Wellman et al. |
| 5,995,884 A | 11/1999 | Allen et al. |
| 6,050,359 A | 4/2000 | Mouri et al. |
| 6,220,219 B1 | 4/2001 | Waddas et al. |
| 6,317,637 B1 | 11/2001 | Limroth |
| 6,414,594 B1 | 7/2002 | Guerlain |
| 6,445,984 B1 | 9/2002 | Kellogg |
| 6,553,302 B2 | 4/2003 | Goodnight et al. |
| 6,591,172 B2 | 7/2003 | Oda et al. |
| 6,643,578 B2 | 11/2003 | Levine |
| 6,781,516 B2 | 8/2004 | Reynard et al. |
| 6,789,008 B2 | 9/2004 | Kato et al. |
| 6,813,557 B2 | 11/2004 | Schmidt et al. |
| 6,853,877 B1 | 2/2005 | Slater et al. |
| 6,931,958 B2 | 8/2005 | Takeda |
| 6,995,688 B2 | 2/2006 | Reynolds |
| 7,099,745 B2 | 8/2006 | Ebert |
| 7,344,037 B1 | 3/2008 | Zakula, Sr. et al. |
| 7,366,600 B2 | 4/2008 | Osaki et al. |
| 7,444,193 B2 | 10/2008 | Cutler |
| 7,634,332 B2 | 12/2009 | Williams et al. |
| 7,739,006 B2 | 6/2010 | Gillula |
| 7,865,277 B1 | 1/2011 | Larson et al. |
| 7,932,827 B2 * | 4/2011 | Chand et al. ............... 340/572.1 |
| 8,060,400 B2 * | 11/2011 | Wellman ...................... 235/375 |
| 8,179,286 B2 * | 5/2012 | Faus et al. .................... 340/989 |
| 8,239,251 B2 * | 8/2012 | Wellman ..................... 705/7.29 |
| 8,239,252 B2 * | 8/2012 | Wellman ..................... 705/7.29 |
| 8,249,910 B2 * | 8/2012 | Wellman et al. ............ 705/7.26 |
| 8,694,194 B2 * | 4/2014 | Waltz et al. .................... 701/25 |
| 2003/0154319 A1 | 8/2003 | Araki et al. |
| 2004/0193363 A1 | 9/2004 | Schmidt et al. |
| 2005/0075784 A1 | 4/2005 | Gray et al. |
| 2005/0131645 A1 | 6/2005 | Panopoulos |
| 2005/0187752 A1 | 8/2005 | Colby et al. |
| 2005/0246078 A1 | 11/2005 | Vercammen |
| 2006/0064216 A1 | 3/2006 | Palmer |
| 2006/0089765 A1 | 4/2006 | Pack et al. |
| 2007/0158128 A1 | 7/2007 | Gratz et al. |
| 2007/0293989 A1 | 12/2007 | Norris |
| 2008/0114533 A1 | 5/2008 | Weiss et al. |
| 2008/0245598 A1 | 10/2008 | Gratz et al. |
| 2009/0222160 A1 | 9/2009 | Morselli et al. |
| 2009/0271058 A1 | 10/2009 | Chilson |
| 2009/0287406 A1 | 11/2009 | Ohi |
| 2009/0288893 A1 | 11/2009 | Wyall et al. |
| 2010/0084207 A1 | 4/2010 | Wyall |
| 2010/0161136 A1 | 6/2010 | Takeshita et al. |
| 2011/0071718 A1 | 3/2011 | Norris et al. |
| 2011/0098890 A1 | 4/2011 | Lee et al. |
| 2011/0251701 A1 | 10/2011 | Jung |
| 2012/0022761 A1 | 1/2012 | Matsuda |
| 2012/0065820 A1 | 3/2012 | Morris |
| 2012/0323432 A1 | 12/2012 | Wong et al. |
| 2013/0054077 A1 * | 2/2013 | Waltz et al. ...................... 701/25 |

OTHER PUBLICATIONS

Office Action pertaining to U.S. Appl. No. 13/626,396 dated Mar. 22, 2013.
Final Office Action pertaining to U.S. Appl. No. 13/626,396 dated Oct. 16, 2013.
Office Action pertaining to U.S. Appl. No. 13/626,400 dated Mar. 27, 2013.
Final Office Action pertaining to U.S. Appl. No. 13/626,400 dated Sep. 23, 2013.
Search Report and Written Opinion pertaining to International Application No. PCT/US2012/052809 dated Dec. 19, 2012.
Search Report and Written Opinion pertaining to International Application No. PCT/US2012/052837 dated Nov. 15, 2012.
Search Report and Written Opinion pertaining to International Application No. PCT/US2012/052820 dated Jan. 22, 2013.
Notice of Allowance pertaining to U.S. Appl. No. 13/626,400 dated Jan. 8, 2014.
Office Action dated Jul. 8, 2014 pertaining to U.S. Appl. No. 14/208,852.
Patent Examination Report No. 1 dated Jun. 20, 2014 pertaining to Australian Patent Application No. 2012302046.
Patent Examination Report pertaining to Australian Patent Application No. 2012302054, dated Jun. 10, 2014.
Communication pursuant to Rules 161(1) and 162 EPC pertaining to European Patent Application No. 12770315.5 dated May 2, 2014.

* cited by examiner

VEHICULAR NAVIGATION CONTROL INTERFACE

CROSS-REFERENCE TO RELATED APPLICATIONS

This application is filed as a continuation of U.S. application Ser. No. 13/626,385 filed on Sep. 25, 2012, which is a continuation of PCT/U.S. Ser. No. 12/052,820, filed Aug. 29, 2012, which international application designates the United States and claims the benefit of U.S. Provisional Application Ser. No. 61/528,497, filed Aug. 29, 2011.

BACKGROUND

Embodiments provided herein generally relate to a navigation control interface, and particularly to a hardware interface between a vehicle control system and a navigation control system.

Many warehouse environments utilize one or more forklifts and/or other vehicles for moving products into, out of, and within the warehouse. Accordingly, many current solutions utilize a vehicle operator to determine which products need to be moved and to where those products will be moved. While the vehicle operators may be capable of sufficiently navigating the vehicle to perform the desired tasks, the operators represent a significant cost to moving goods through a warehouse.

SUMMARY

Included are systems and methods for providing a vehicular navigation control interface. Some embodiments include a navigation system and a vehicle with a vehicle control module (VCM), a navigation control module (NCM), and a navigation control interface, where the VCM receives a manual command from an operator to implement a manual control function. In some embodiments the NCM receives an automatic command from the navigation system to implement an automatic control function via the VCM and the navigation control interface directly connects the VCM and the NCM to facilitate communication between the VCM and NCM for implementing automatic mode and for reporting implementation of a manual mode.

Also included are embodiments of a vehicle. The vehicle may include a vehicle control module (VCM), a navigation control module (NCM), a hardware interface, a traction control module (TCM), and a steering control module (SCM). In some embodiments, the VCM receives a manual command from an operator to implement a manual control function, causes the vehicle to implement the manual command, and sends data related to the manual command to the NCM. Similarly, in some embodiments, the NCM receives an automatic command from a navigation system to implement an automatic control function, sends data related to the automatic command to the VCM for implementing the automatic command, and the hardware interface directly connects the VCM and the NCM to facilitate communication of data between the VCM and NCM.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
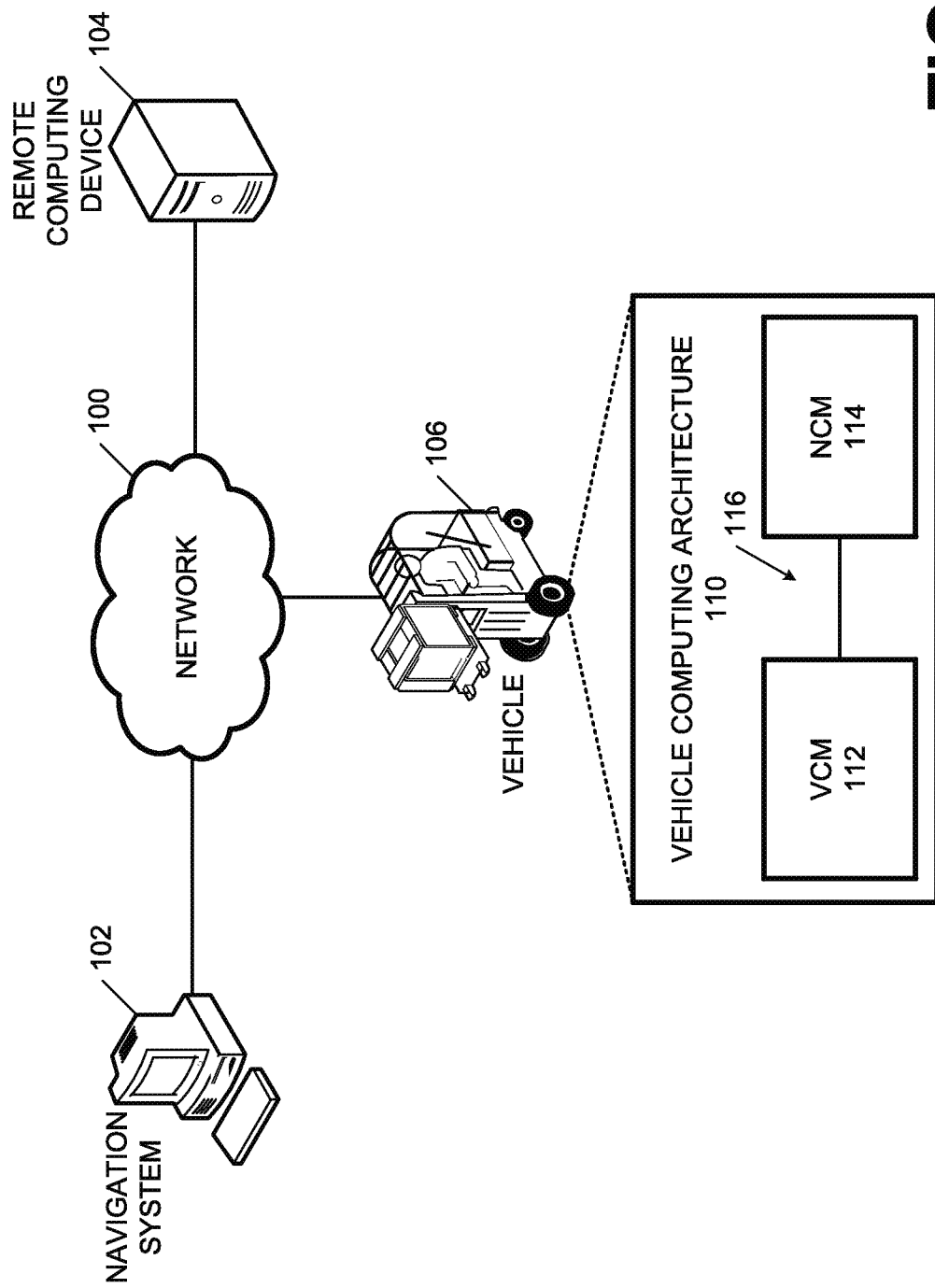
FIG. 1 depicts a computing environment for utilizing a navigation control interface, according to one or more embodiments shown and described herein.

FIG. 1 depicts a computing environment for utilizing a navigation control interface 116 to facilitate the communication of data, according to one or more embodiments shown and described herein. As illustrated, a network 100 may facilitate communication among a navigation system 102, a remote computing device 104, and a vehicle 106. The network 100 may include a wired and/or wireless local area network, wide area network, and/or other type of network for communicating information. The navigation system 102 may be configured as a server or other computing device and may be located at a warehouse or other environment. The navigation system 102 may be configured for sending navigation to the vehicle 106 and/or receiving navigation data from the vehicle 106. Additionally, the remote computing device 104, which may be implemented as a warehouse management system or other system, may be configured for processing work orders. The work orders may identify the location of a product that needs to be moved and/or provide other similar information. With the work order information, the navigation system 102 and/or remote computing device 104 may be configured to determine a vehicle for performing the desired task. Additionally, the navigation system 102 may determine an order of priority that tasks are performed by a particular vehicle 106. The navigation system 102 may communicate with the vehicle 106 to determine the location of the vehicle 106. With the location of the vehicle 106, the navigation system 102 may more efficiently assign tasks to the vehicle 106. Additionally, the communication between the navigation system 102 and the vehicle 106 may include sending the predetermined destination and/or routing data to the vehicle 106. The routing data may include a plurality of path segments, which may include one or more lines and/or arcs for reaching a predetermined destination from the current location of the vehicle 106. In some embodiments, however, the vehicle 106 receives coordinates of the predetermined destination and determines its own routing to reach those coordinates.

Also included is the remote computing device 104. The remote computing device 104 may also be configured as a server or other computing device and may be configured to provide the navigation system 102 with the work orders, and/or other information. In some embodiments, the remote computing device 104 may be located on the same premises as the navigation system 102, while in some embodiments the remote computing device 104 may be located remotely from the navigation system 102. Similarly, depending on the particular embodiment, the remote computing device 104 may be configured to service one or more different environments and communicate with one or more different navigation systems.

FIG. 1 also includes the vehicle 106. The vehicle 106 may be configured as a warehouse vehicle, such as a forklift, truck, etc. Additionally, the vehicle 106 may include one or more vehicle control systems, such as a steering system, a braking system, a traction system, etc. The vehicle 106 also includes a user interface, location tracking sensors (such as laser sensors, light sensors, etc.), and vehicle computing architecture 110, which may include a vehicle control module (VCM) 112 and a navigation control module (NCM) 114. As discussed in more detail below, the VCM 112 may facilitate operator initiated control of the vehicle 106 through the use of a manual mode. The NCM 114 may be configured to facilitate system-initiated operation of the vehicle 106 through the use of an auto operation mode. Also illustrated is a navigation control interface 116 for facilitating communication and coordination between the VCM 112 and the NCM 114.

Figure 2:
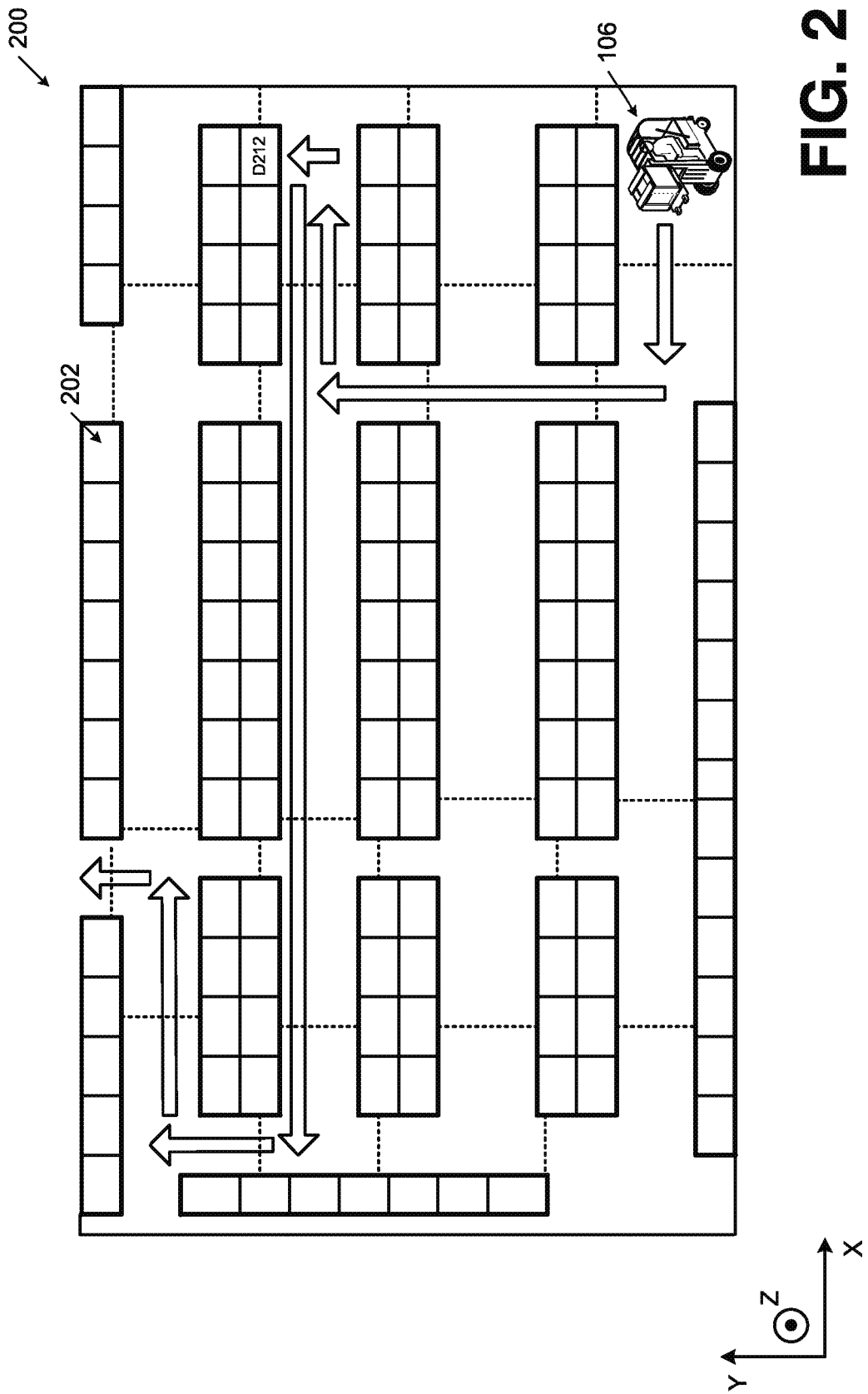
FIG. 2 depicts an environment map for providing vehicle navigation, according to embodiments shown and disclosed herein.

FIG. 2 depicts an environment map 200 for providing vehicle navigation, according to embodiments shown and disclosed herein. As illustrated, the environment map 200 may simulate an environment, such as a warehouse and may include a plurality of products 202. The products may be organized in a predetermined arrangement and may not only be arranged along the floor (in the "x" and "y" directions), but may also be stacked vertically (in the "z" direction). As discussed briefly above, the vehicle 106 may be operated in manual mode by an operator sending a manual command to the vehicle 106. The operator may then implement a manual control function to manually navigate the vehicle 106 to the predetermined destination, perform the desired task, and then proceed to the next task.

If an automatic command has been sent to the vehicle 106, the vehicle 106 may operate in automatic mode and thus may implement an automatic control function. Thus, the vehicle 106 may perform the desired tasks without the assistance of a human operator. As such, the vehicle 106 may receive one or more locations (or a predetermined route) from the navigation system 102. With this information, the vehicle 106 may travel to a predetermined destination, perform the desired task, and then proceed to the next location.

As an example, if the vehicle 106 is currently operating in automatic mode, the vehicle 106 may receive a task, a predetermined destination (address D212), and/or a route for reaching the predetermined destination. Depending on the information received, the vehicle 106 may calculate a route to the predetermined location at the address D212 and may then perform the task. In this particular example, the task requests the vehicle 106 to pick up the product located at the address D212. From the current location of the vehicle 106, the vehicle 106 may then use sensors and mapping data to navigate according to the determined path. In some embodiments, the vehicle 106 may include a light sensor. The light sensor may determine the relative position of the vehicle 106 with regard to the overhead lighting fixtures. Based on this information, and/or other information (such as laser sensor information, odometer readings, etc.), the vehicle 106 (and/or the navigation system 102) may ensure that the vehicle 106 is on the correct path.

Figure 3:
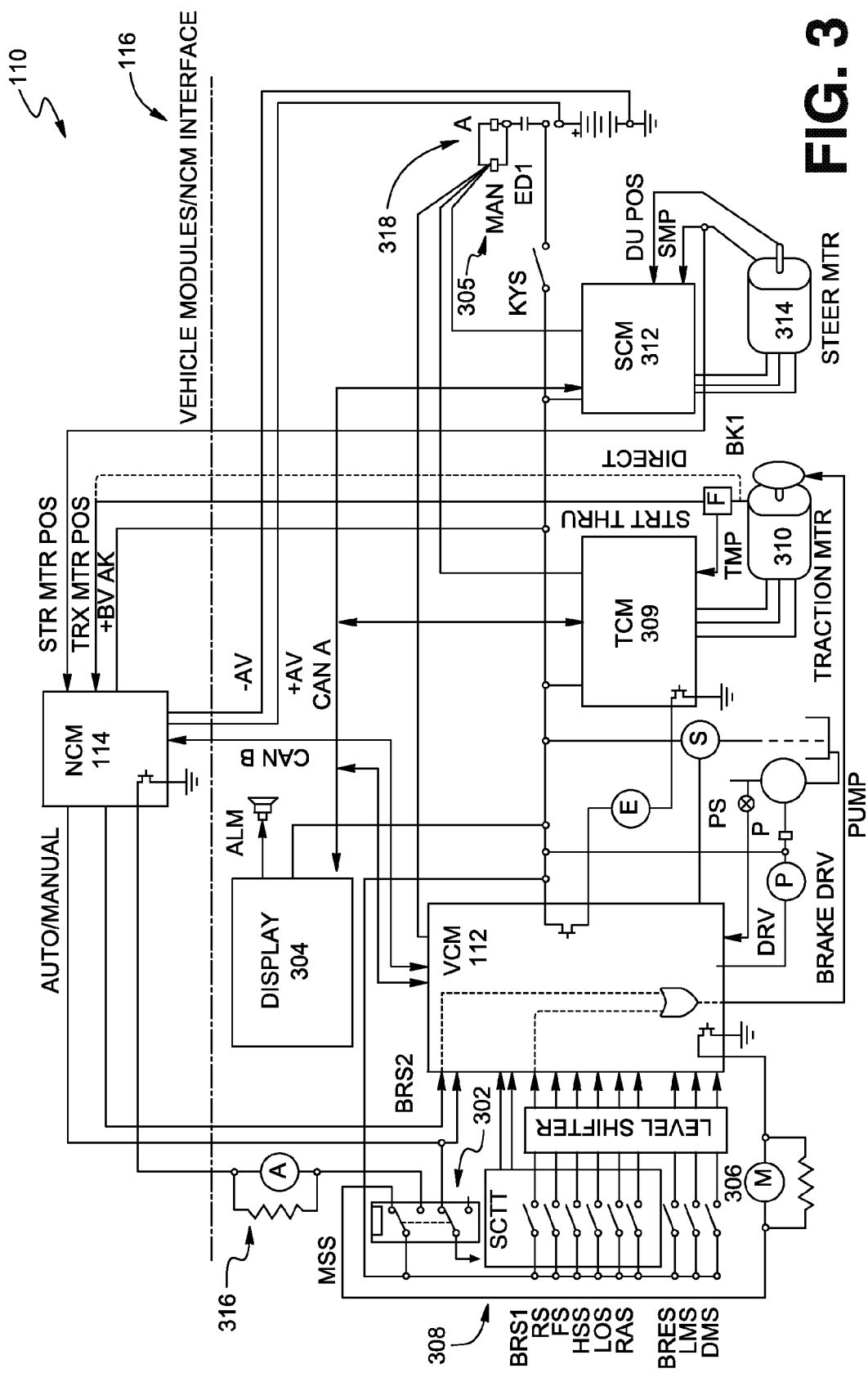
FIG. 3 depicts a circuit diagram for a vehicular computing architecture, according to one or more embodiments shown and described herein.

FIG. 3 depicts a circuit diagram for a vehicle computing architecture 110, according to one or more embodiments shown and described herein. As illustrated, the vehicle computing architecture 110 includes the VCM 112 and the NCM 114. Also included is the navigation control interface 116. The navigation control interface 116 may be configured as a hardware interface between the components of the vehicle 106 (and VCM 112) and the components of the NCM 114. The navigation control interface 116 may also allow a single VCM that can be used across many different vehicles and/or NCMs with little initial configuration. Specifically, because the navigation control interface 116 provides a direct medium for communication between the VCM 112 and the NCM 114, a specially configured VCM is unnecessary. As illustrated, the vehicle computing architecture 110 includes a can A line and a can B line. The can A line provides a communication medium among the display 304, the VCM 112, a traction control module (TCM) 308 for implementing traction control, and a steering control module (SCM) 312 that is configured to receive and implement a steering command. Similarly, the can B line is part of the navigation control interface 116 that couples the VCM 112 with the NCM 114. As discussed in more detail below, the can B facilitates sending and receiving of messages between the VCM 112 and the NCM 114.

Also included in the vehicle computing architecture 110 is a mode select switch (MSS) 302. The MSS 302 may be configured with two bi-pole switches for selecting manual mode or automatic mode. Specifically, a display 304 may be provided on the vehicle 106 and may be configured as a user interface for providing the operator with an option to select manual mode or automatic mode. However, this is merely an example, as some embodiments may include a physical switch to implement this selection. Regardless, in response to selection of the manual mode, the MSS 302 switches the bi-poles to the upward position (as shown). With the bi-poles in this position, battery voltage is provided to a manual coil 306, which enables the VCM 112 to have control of turning on the manual coil 306 by sinking the low side of the circuit to ground, which activates a manual contactor 305 so that bus power can be distributed to the motor controllers (TCM 309, SCM 312) for commanding motion on the truck. The SCTT 308 can receive operator commands in the form of a brake switch (BRS1), a reverse switch (RS), a forward switch (FS), a lower switch (LOS), a raise switch (RAS), a dead man switch (DMS), a high speed switch (HSS), a live man switch (LMS), and a battery restraint (BRES) switch. Also included is a level shifter for providing the commands to the VCM 112, which may not be utilized, depending on the particular embodiment. From the VCM 112, the manual operations commands may be processed and converted to a torque or speed command and be sent to the TCM 309, which is coupled to a traction motor 310. The TCM 309 may operate as a motor controller and is thus configured to provide a power signal, which includes a voltage and frequency, directly to a motor of the vehicle 106. Similarly, the manual commands may be processed and converted to a speed or position command and be sent to the SCM 312, which is coupled to a steering motor 314. Through this mode of operation, the VCM 112 can facilitate manual operation of the vehicle 106.

Similarly, when an automatic mode of operation is selected, such as through the MSS 302, the MSS 302 switches position of the bi-poles. With the bi-poles switched into automatic mode, battery voltage is provided to an auto coil 316, which enables the NCM 114 to have control of turning the auto coil 316 on by sinking the low side of the circuit to ground, which activates the automatic contactor 318.

It should be understood that while the embodiment of FIG. 3 only depicts the TCM 309 and the SCM 312, this is merely an example. Other components for controlling various functions of the vehicle 106 may also be included, depending on the particular embodiment.

Figure 4:
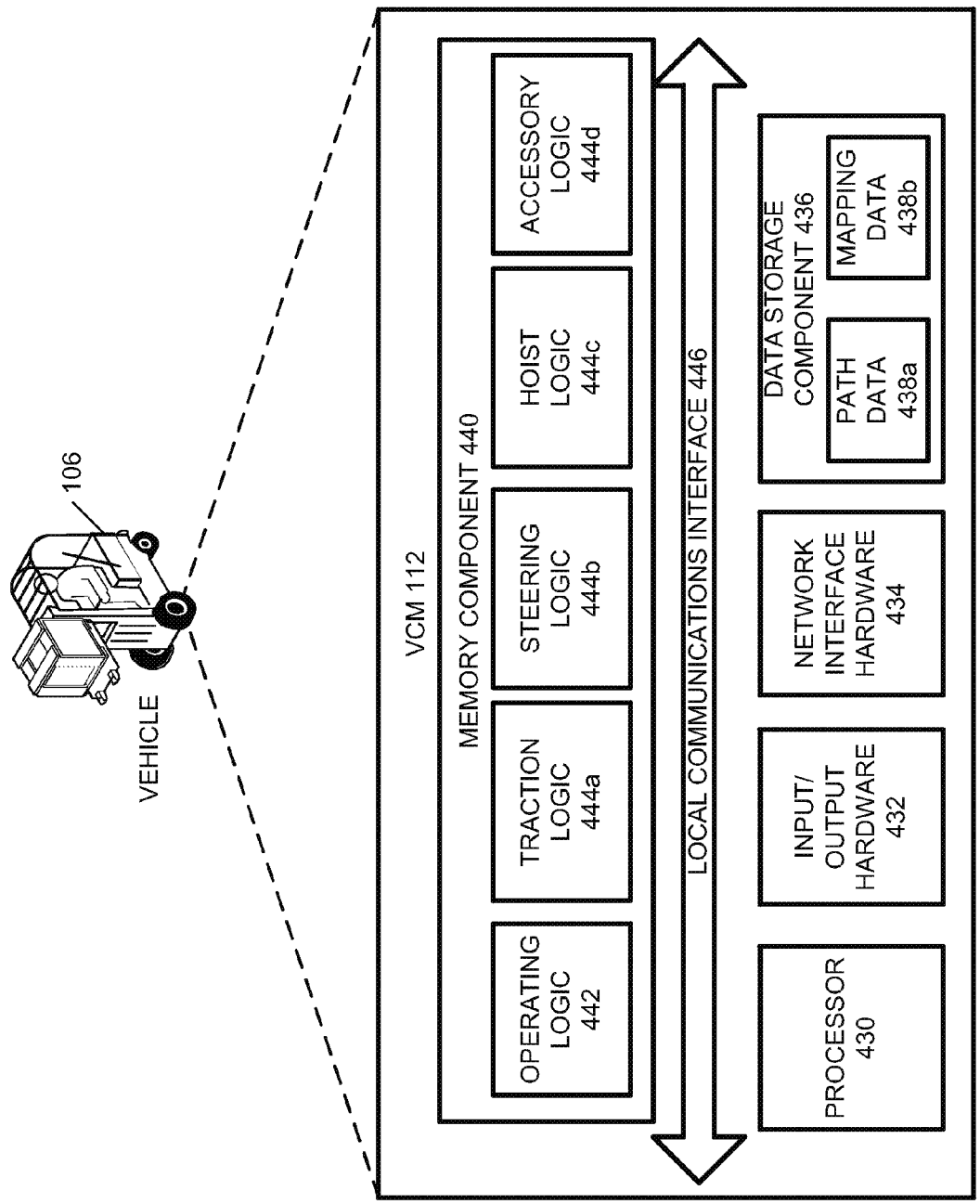
FIG. 4 depicts a computing environment for providing control logic in a vehicle control module, according to one or more embodiments shown and described herein.

FIG. 4 depicts a computing environment for providing control logic in a vehicle control module (VCM) 112, according to one or more embodiments shown and described herein. In the illustrated embodiment, the VCM 112 includes a processor 430, input/output hardware 432, a data storage component 436 (which stores path data 438a, mapping data 438b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, the non-transitory computer-readable medium may reside within the VCM 112 and/or external to the VCM 112.

Additionally, the memory component 140 may store operating logic 442, traction logic 444a, steering logic 444b, hoist logic 444c, and accessory logic 444d. The operating logic 442 may include an operating system and/or other software for managing components of the VCM 112. The traction logic 444a may be configured with one or more algorithms and parameters for facilitating optimal traction control for the vehicle 106. The steering logic 444b may be configured with one or more algorithms and parameters for facilitating optimal steering control of the vehicle 106. The hoist logic 444c may include one or more algorithms and parameters for facilitating optimal hoist control of the vehicle 106. Additionally, the accessory logic 444d may include one or more algorithms and parameters for providing control of accessories of the vehicle 106. A local communication interface 446 is also included in FIG. 4 and may be implemented as a bus or other communication interface to facilitate communication among the components of the VCM 112.

The processor 430 may include any processing component operable to receive and execute instructions (such as from the data storage component 436 and/or the memory component 140). The input/output hardware 432 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 434 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 112 and other computing devices.

It should be understood that the components illustrated in FIG. 4 are merely exemplary and are not intended to limit the scope of this disclosure. While the components in FIG. 4 are illustrated as residing within the VCM 112, this is merely an example. In some embodiments, one or more of the components may reside external to the VCM 112. It should also be understood that while the VCM 112 in FIG. 4 is illustrated as a single device, this is also merely an example. In some embodiments, the traction logic 444a, the steering logic 444b, the hoist logic 444c, and/or the accessory logic 444d may reside on different devices. Additionally, while the VCM 112 is illustrated with the traction logic 444a, the steering logic 444b, the hoist logic 444c, and the accessory logic 444d as separate logical components, this is also an example. In some embodiments, a single piece of logic may cause the VCM 112 to provide the described functionality. Further, the NCM 114, the navigation system 102, and the remote computing device 104 may include similar components and logic as depicted for the VCM 112 in FIG. 4 to perform the functionality described herein.

It also should be understood that the VCM 112 may communicate with the NCM 114 via the navigation control interface 116 to coordinate the various conditions of manual operation and automatic operation of the vehicle 106. As such, Tables 1-8 below represent examples of data that may be sent from the VCM 112 to the NCM 114.

TABLE 1

| VCM to NCM message type A | |
|---|---|
| Producer | VCM |
| CAN ID | A/B |
| Purpose | System Info & Status |
| Length | 8 |
| Consumers | NCM |
| Report Rate | Every 16 mS |

| Byte | Contents | Description | Units/Scaling |
|---|---|---|---|
| Byte 0 | Vehicle System ID Data (LSB) | | |
| Byte 1 | Vehicle System ID Data (MSB) | | |
| Byte 2 | Vehicle State | Enumeration | 1 = Initialization, 2 = Standby, 3 = Manual, 4 = Auto, 5 = reserved, 6 = reserved, 7 = Error |
| Byte 3 | Vehicle Status Word (LSB) | Bit 0- MSS Switch State | 0 - Man, 1 - Auto |
| | | Bit 1- BRS1 Switch State | 0 - Off, 1 - On |
| | | Bit 2- ED1 Contactor State | 0 - Open, 1 - Closed |
| | | Bit 3- MAN Contactor State | 0 - Open, 1 - Closed |
| | | Bit 4- Error Bit 1 | Enumerated |
| | | Bit 5- Error Bit 2 | Error codes 0-15 |
| | | Bit 6- Error Bit 3 | |
| | | Bit 7- Error Bit 4 | |

TABLE 1-continued

VCM to NCM message type A

| Byte 4 | Vehicle Status Word (MSB) | Bit 8- Traction Mode Bit 1 | Enumeration |
| --- | --- | --- | --- |
| | | Bit 9- Traction Mode Bit 2 | 0-3** |
| | | Bit 10- Steer Mode Bit 1 | Enumeration |
| | | Bit 11- Steer Mode Bit 2 | 0-3** |
| | | Bit 12- Hoist Mode Bit 1 | -Enumeration |
| | | Bit 13- Hoist Mode Bit 2 | 0-3** |
| | | Bit 14- Accessory Mode Bit 1 | Enumeration |
| | | Bit 15- Accessory Mode Bit 2 | 0-3** |
| Byte 5 | Freshness Counter | 0-255 Counts | Increase 1 each tx |
| Byte 6 | Load Weight (LSB) | 0 to 65535 | LBS |
| Byte 7 | Load Weight (MSB) | | |

As illustrated in Table 1, the VCM 112 may communicate vehicle data directly with NCM 114 via the navigation control interface 116 (FIG. 1). Accordingly, the VCM 112 may include a data packet or stream that includes a plurality of bytes of data (e.g., 4, 8, 16, 32 bytes, etc.). In the example of Table 1, the data is structured as an 8 byte communication, where the byte 0 and byte 1 provide a vehicle identifier. Byte 2 may be utilized for providing a vehicle state. As an example, initialization may be identified as a first vehicle state, with standby, manual, auto as additional vehicle states. If there is error in the vehicle state, a byte configuration may be allocated for such an occurrence.

Similarly, bytes 3 and 4 may be utilized for a vehicle status. As an example, bit 0 may be utilized for a state of the MSS 302 (manual/auto). Bit 1 may be utilized to identify a brake switch state of BRS1 (on/off). Bit 2 may be utilized to identify the ED1 contactor state (open/closed). Bit 3 may be utilized to identify a state of the manual contactor 305. Similarly, byte 4 is utilized for identifying a functional mode, such as a traction mode, steering mode, hoist mode, and accessory mode. Bits 4-7 may be utilized for up to 15 different error codes. Byte 5 may be used as a freshness counter, while bytes 6 and 7 may be utilized to identify the load weight on the fork.

TABLE 2

VCM to NCM message type B

| | |
| --- | --- |
| Producer | VCM |
| CAN ID | A/B |
| Purpose | Traction Speed Feedback and Limits |
| Length | 8 |
| Consumers | NCM |
| Report Rate | Every 16 mS |

| Byte | Contents | Description | Units/Scaling |
| --- | --- | --- | --- |
| Byte 0 | TrxSpdFB (LSB) | −32000 to +32000 | mm/sec |
| Byte 1 | TrxSpdFB (MSB) | | |
| Byte 2 | TrxSpdLimit (LSB) | −32000 to +32000 | mm/sec |
| Byte 3 | TrxSpdLimit (MSB) | | |
| Byte 4 | TrxAccelForceLimit (LSB) | −32000 to +32000 | N |
| Byte 5 | TrxAccelForceLimit (MSB) | | |
| Byte 6 | TrxDecelForceLimit (LSB) | −32000 to +32000 | N |
| Byte 7 | TrxDecelForceLimit (MSB) | | |

As illustrated, Table 2 identifies traction data that may be sent from the VCM 112 to the NCM 114 via the navigation control interface 116. Specifically, the purpose of the message in Table 2 is traction speed feedback and vehicle limits. Again, while Table 2 indicates that the data is sent as an 8 byte message, this is merely an example. Regardless, Table 2 illustrates that byte 0 and byte 1 are utilized for traction speed feedback. Bytes 2 and 3 may be utilized for identifying a traction speed limit. Bytes 4 and 5 may be utilized to identify a traction acceleration force limit. Bytes 6 and 7 may be utilized to identify a traction deceleration force limit.

Specifically, the traction speed feedback of bytes 0 and 1 may be communicated from the VCM 112 to the NCM 114 to identify a current speed and/or traction state that the vehicle 106 is experiencing. Additionally, the vehicle 106 may be subject to one or more vehicle limits that are imposed. The vehicle limits may include a speed limit, an acceleration limit, and/or a deceleration limit.

TABLE 3

VCM to NCM message Type C

| | |
| --- | --- |
| Producer | VCM |
| CAN ID | A/B |
| Purpose | Steering Feedback and Limits |
| Length | 8 |
| Consumers | NCM |
| Report Rate | Every 16 mS |

| Byte | Contents | Description | Units/Scaling |
| --- | --- | --- | --- |
| Byte 0 | WhAngFB (LSB) | −18000 to +18000 | Deg * 100 |
| Byte 1 | WhAngFB (MSB) | | |
| Byte 2 | WhAngLimitCCW (LSB) | −18000 to +18000 | Deg * 100 |
| Byte 3 | WhAngLimitCCW (MSB) | | |
| Byte 4 | WhAngLimitCW (LSB) | −18000 to +18000 | Deg * 100 |
| Byte 5 | WhAngLimitCW (MSB) | | |
| Byte 6 | WhAngRateLimit (LSB) | 0 to +65535 | Deg/sec * 1000 |
| Byte 7 | WhAngRateLimit (MSB) | | |

Table 3 includes steering data that is sent from the VCM 112 to the NCM 114 via the navigation control interface 116. Specifically, bytes 0 and 1 may be utilized to provide current wheel angle feedback of the vehicle. Bytes 2 and 3 may be utilized to identify a counterclockwise wheel angle limit. Bytes 4 and 5 may be utilized to identify a clockwise wheel angle limit. Bytes 6 and 7 may be utilized to identify a wheel angle rate limit of rotation.

TABLE 4

VCM to NCM message type D

| | |
| --- | --- |
| Producer | VCM |
| CAN ID | A/B |
| Purpose | Hoist Feedback and Limits |
| Length | 8 |
| Consumers | NCM |
| Report Rate | Every 16 mS |

| Byte | Contents | Description | Units/Scaling |
| --- | --- | --- | --- |
| Byte 0 | ForkHgt(LSB) | 0 to +32000 | mm |
| Byte 1 | ForkHgt(MSB) | | |
| Byte 2 | HoistSpdLimit (LSB) | −32000 to +32000 | mm/sec |

TABLE 4-continued

| | VCM to NCM message type D | | |
|---|---|---|---|
| Byte 3 | HoistSpdLimit (MSB) | | |
| Byte 4 | HoistAccelLimit (LSB) | −32000 to +32000 | mm/sec$^2$ |
| Byte 5 | HoistAccelLimit (MSB) | | |
| Byte 6 | HgtLimit (LSB) | 0 to +32000 | mm |
| Byte 7 | HgtLimit (MSB) | | |

Table 4 includes hoist data that may be communicated by the VCM 112 to the NCM 114 via the navigation control interface 116. Specifically, the data provided in this message reports information regarding the current state of the fork. Accordingly, bytes 0 and 1 may be utilized to identify the current fork height of the vehicle 106. Bytes 2 and 3 may be utilized to identify a fork hoist speed limit of the vehicle 106. Bytes 4 and 5 may be utilized to identify a hoist acceleration limit of the fork. Bytes 6 and 7 may be utilized to identify a hoist height limit of the fork.

TABLE 5

| VCM to NCM message type E | |
|---|---|
| Producer | VCM |
| CAN ID | A/B |
| Purpose | Accessory 1 Feedback and Limits* |
| Length | 8 |
| Consumers | NCM |
| Report Rate | Every 16 mS |

| Byte | Contents | Description | Units/Scaling |
|---|---|---|---|
| Byte 0 | Accy 1 Pos (LSB) | | Deg or mm |
| Byte 1 | Accy 1 Pos (MSB) | | |
| Byte 2 | Accy 1 UpperLimit (LSB) | | Deg or mm |
| Byte 3 | Accy 1 UpperLimit (MSB) | | |
| Byte 4 | Accy 1 LowerLimit (LSB) | | Deg or mm |
| Byte 5 | Accy 1 LowerLimit (MSB) | | |
| Byte 6 | Accy 1 Speed Limit (LSB) | | deg/sec * 100 or mm/sec |
| Byte 7 | Accy 1 Speed Limit (MSB) | | |

Table 5 includes vehicle accessory data that may be communicated by the VCM 112 to the NCM 114 via the navigation control interface 116. Specifically, bytes 0 and 1 may be utilized to identify a position of an accessory of the vehicle 106. Bytes 2 and 3 may be utilized to identify an accessory upper limit of the vehicle 106. Bytes 4 and 5 may be utilized to identify an accessory lower limit. Bytes 6 and 7 may be utilized to identify an accessory speed limit.

TABLE 6

| VCM to NCM message type F | |
|---|---|
| Producer | VCM |
| CAN ID | A/B |
| Purpose | Accessory 2 Feedback and Limits* |
| Length | 8 |
| Consumers | NCM |
| Report Rate | Every 16 mS |

| Byte | Contents | Description | Units/Scaling |
|---|---|---|---|
| Byte 0 | Accy 2 Pos (LSB) | | Deg or mm |
| Byte 1 | Accy 2 Pos (MSB) | | |
| Byte 2 | Accy 2 UpperLimit (LSB) | | Deg or mm |
| Byte 3 | Accy 2 UpperLimit (MSB) | | |
| Byte 4 | Accy 2 LowerLimit (LSB) | | Deg or mm |
| Byte 5 | Accy 2 LowerLimit (MSB) | | |
| Byte 6 | Accy 2 Rate Limit (LSB) | | deg/sec * 100 or mm/sec |
| Byte 7 | Accy 2 Rate Limit (MSB) | | |

Table 6 includes vehicle accessory data that may be communicated by the VCM 112 to the NCM 114 via the navigation control interface 116. Specifically, the date in table 6 is related to a second accessory on the vehicle 106. Accordingly, bytes 0 and 1 may be utilized to identify a position of an accessory of the vehicle 106. Bytes 2 and 3 may be utilized to identify an accessory upper limit of the accessory. Bytes 4 and 5 may be utilized to identify an accessory lower limit. Bytes 6 and 7 may be utilized to identify an accessory speed limit.

TABLE 7

| VCM to NCM message type G | |
|---|---|
| Producer | VCM |
| CAN ID | A/B |
| Purpose | Accessory 3 Feedback and Limits* |
| Length | 8 |
| Consumers | NCM |
| Report Rate | Every 16 mS |

| Byte | Contents | Description | Units/Scaling |
|---|---|---|---|
| Byte 0 | Accy 3 Pos (LSB) | | Deg or mm |
| Byte 1 | Accy 3 Pos (MSB) | | |
| Byte 2 | Accy 3 UpperLimit (LSB) | | Deg or mm |
| Byte 3 | Accy 3 UpperLimit (MSB) | | |
| Byte 4 | Accy 3 LowerLimit (LSB) | | Deg or mm |
| Byte 5 | Accy 3 LowerLimit (MSB) | | |
| Byte 6 | Accy 3 Rate Limit (LSB) | | deg/sec * 100 or mm/sec |
| Byte 7 | Accy 3 Rate Limit (MSB) | | |

Table 7 includes additional vehicle accessory data that may be communicated by the VCM 112 to the NCM 114 via the navigation control interface 116. Specifically, bytes 0 and 1 may be utilized to identify a position of an accessory of the vehicle 106. Bytes 2 and 3 may be utilized to identify an accessory upper limit of the accessory. Bytes 4 and 5 may be utilized to identify an accessory lower limit. Bytes 6 and 7 may be utilized to identify an accessory speed limit.

TABLE 8

| VCM to NCM message type G | |
|---|---|
| Producer | VCM |
| CAN ID | A/B |
| Purpose | Accessory 4 Feedback and Limits* |
| Length | 8 |
| Consumers | NCM |
| Report Rate | Every 16 mS |

| Byte | Contents | Description | Units/Scaling |
|---|---|---|---|
| Byte 0 | Accy 4 Pos (LSB) | | Deg or mm |
| Byte 1 | Accy 4 Pos (MSB) | | |
| Byte 2 | Accy 4 UpperLimit (LSB) | | Deg or mm |
| Byte 3 | Accy 4 UpperLimit (MSB) | | |
| Byte 4 | Accy 4 LowerLimit (LSB) | | Deg or mm |
| Byte 5 | Accy 4 LowerLimit (MSB) | | |
| Byte 6 | Accy 4 Rate Limit (LSB) | | deg/sec * 100 or mm/sec |
| Byte 7 | Accy 4 Rate Limit (MSB) | | |

*Accessory Function Matrix is located in Table

Table 8 includes additional vehicle accessory data that may be communicated by the VCM 112 to the NCM 114 via the navigation control interface 116. Specifically, bytes 0 and 1 may be utilized to identify a position of an accessory of the vehicle 106. Bytes 2 and 3 may be utilized to identify an accessory upper limit of the accessory. Bytes 4 and 5 may be utilized to identify an accessory lower limit. Bytes 6 and 7 may be utilized to identify an accessory speed limit.

Similarly Tables 9-16 represent data that may be sent from the NCM 114 to the VCM 112. While the communications from the VCM 112 to the NCM 114, depicted in Tables 1-8 may be utilized to report vehicle conditions and/or limits, the communications from the NCM 114 to the VCM 112 (in at least some embodiments) include control commands to control the vehicle in automatic mode. In such embodiments, the NCM 114 may determine an automatic control function, such as an acceleration, turn, fork extension, etc., and may communicate this command to the VCM 112. The VCM 112 may then send a command to the appropriate power component, such as the TCM 309, SCM 312, etc., which may then send a power signal to a motor for implementing the desired automatic control function. Accordingly the data in Tables 9-16.

tion system status. Specifically, bytes 3 and 4 may be utilized to identify a state of the MSS 302, a brake switch state of the BRS1, and/or an automatic contactor state of the automatic contactor 318 (FIG. 3). Byte 3 may be utilized for error codes. Byte 4 may be utilized to identify a functional mode for the vehicle 106, such as traction mode, steer mode, hoist mode, and accessory mode. Byte 5 may be utilized to provide a freshness counter. Byte 6 may be utilized to indicate a current braking status for the vehicle 106.

TABLE 9

NCM to VCM message type A

| | | |
|---|---|---|
| Producer | NCM | |
| CAN ID | A/B | |
| Purpose | System Info & Status | |
| Length | 8 | |
| Consumers | VCM | |
| Report Rate | Every 16 mS | |

| Byte | Contents | Description | Units/Scaling |
|---|---|---|---|
| Byte 0 | AGV System ID Data (LSB) | | |
| Byte 1 | AGV System ID Data (MSB) | | |
| Byte 2 | NS State | Enumeration | 1 = Initialization,<br>2 = Standby,<br>3 = Manual,<br>4 = Auto<br>5 = reserved<br>6 = reserved<br>7 = Error |
| Byte 3 | NS Status Word (LSB) | Bit 0- MSS State<br>Bit 1- BRS1 Switch State<br>Bit 2- AUTO Contactor State<br>Bit 3- reserved<br>Bit 4- Error Bit 1<br>Bit 5- Error Bit 2<br>Bit 6- Error Bit 3<br>Bit 7- Error Bit 4 | 0 - Man, 1 - Auto<br>0 - Off, 1 - On<br>0 - Open, 1 - Closed<br>reserved<br>Enumerated<br>Error codes 0-15 |
| Byte 4 | NS Status Word (MSB) | Bit 8- Traction Mode Bit 1<br>Bit 9- Traction Mode Bit 2<br>Bit 10- Steer Mode Bit 1<br>Bit 11- Steer Mode Bit 2<br>Bit 12- Hoist Mode Bit 1<br>Bit 13- Hoist Mode Bit 2<br>Bit 14- Accessory Mode Bit 1<br>Bit 15- Accessory Mode Bit 2 | Enumeration<br>0-3<br>Enumeration<br>0-3<br>Enumeration<br>0-3<br>Enumeration<br>0-3 |
| Byte 5 | Freshness Counter | 0-255 Counts | Increase 1 each tx |
| Byte 6 | Braking Status Word | | 1 - No braking<br>2 - Plug brake<br>3 - Service brake |
| Byte 7 | | reserved | |

Table 9 includes system data that may be communicated by the NCM 114 to the VCM 112 via the navigation control interface 116. Specifically, bytes 0 and 1 may be utilized to provide the system identifier data. Byte 2 may be utilized to identify a navigation system state, which is a vehicle state as understood by the navigation system 102. Specifically, the vehicle 106 may be operating in a state, such as initialization, standby, manual, auto, etc. Additionally, the navigation system 102 and/or NCM 114 may also store the current state of the vehicle 106. Thus, the NCM 114 may send the vehicle 106 state as stored by the navigation system 102 to the VCM 112 so that the data may be compared, updated, and/or correlated. Similarly, bytes 3 and 4 may be utilized to identify a naviga-

TABLE 10

NCM to VCM message type B

| | |
|---|---|
| Producer | NCM |
| CAN ID | A/B |
| Purpose | Traction Commands |
| Length | 8 |
| Consumers | VCM |
| Report Rate | Every 16 mS |

| Byte | Contents | Description | Units/Scaling |
|---|---|---|---|
| Byte 0 | TrxCmd (LSB) | −32000 to +32000 | * |
| Byte 1 | TrxCmd (MSB) | | |
| Byte 2 | TrxPGain (LSB) | 0 to +32000 | |
| Byte 3 | TrxPGain (MSB) | | |
| Byte 4 | TrxIGain (LSB) | 0 to +32000/0 command | |
| Byte 5 | TrxIGain (MSB) | resets integral | |

TABLE 10-continued

NCM to VCM message type B

| Byte 6 | reserved |
| Byte 7 | reserved |

Table 10 identifies traction command data that may be sent from the NCM 114 to the VCM 112 via the navigation control interface 116. Specifically, the purpose of the message in Table 10 is to provide traction commands to the VCM 112 when the vehicle 106 is operating in automatic mode. Accordingly, the NCM 114 may send a traction command with bytes 0 and 1. The NCM 114 may send a traction P gain with bytes 2 and 3. The NCM 114 may send a traction I gain in bytes 4 and 5.

TABLE 11

NCM to VCM message type C

| | |
|---|---|
| Producer | NCM |
| CAN ID | A/B |
| Purpose | Steering Commands |
| Length | 8 |
| Consumers | VCM |
| Report Rate | Every 16 mS |

| Byte | Contents | Description | Units/Scaling |
|---|---|---|---|
| Byte 0 | WhAngCmd (LSB) | −32000 to +32000 | *** |
| Byte 1 | WhAngCmd (MSB) | | |
| Byte 2 | WhAngPGain (LSB) | 0 to +32000 | * |
| Byte 3 | WhAngPGain (MSB) | | |
| Byte 4 | WhAngIGain (LSB) | 0 to +32000/0 command | |
| Byte 5 | WhAngIGain (MSB) | resets integral | |
| Byte 6 | Reserved | | |
| Byte 7 | Reserved | | |

Similar to Table 10, Table 11 identifies commands that may be sent from the NCM 114 to the VCM 112 via the navigation control interface 116 when the vehicle in operating in automatic mode. The purpose of the message in Table 11 is to provide wheel angle commands to the VCM 112 when the vehicle 106 is operating in automatic mode. Accordingly, the NCM 114 may send a wheel angle command with bytes 0 and 1. The NCM 114 may send a wheel angle P gain with bytes 2 and 3. The NCM 114 may send a wheel angle I gain in bytes 4 and 5.

TABLE 12

NCM to VCM message type D

| | |
|---|---|
| Producer | NCM |
| CAN ID | A/B |
| Purpose | Hoist Commands |
| Length | 8 |
| Consumers | VCM |
| Report Rate | Every 16 mS |

| Byte | Contents | Description | Units/Scaling |
|---|---|---|---|
| Byte 0 | HoistCmd (LSB) | −32000 to +32000 | * |
| Byte 1 | HoistCmd (MSB) | | |
| Byte 2 | HoistPGain (LSB) | 0 to +32000 | |
| Byte 3 | HoistPGain (MSB) | | |
| Byte 4 | HoistIGain (LSB) | 0 to +32000/0 command | |
| Byte 5 | HoistIGain (MSB) | resets integral | |
| Byte 6 | Reserved | | |
| Byte 7 | Reserved | | |

As illustrated, Table 12 identifies hoist command data that may be sent from the NCM 114 to the VCM 112 via the navigation control interface 116 when the vehicle in operating in automatic mode. The purpose of the message in Table 12 is to provide hoist commands to the VCM 112 when the vehicle 106 is operating in automatic mode. Accordingly, the NCM 114 may send a hoist command with bytes 0 and 1. The NCM 114 may send a hoist P gain with bytes 2 and 3. The NCM 114 may send a hoist I gain in bytes 4 and 5.

TABLE 13

NCM to VCM message type E

| | |
|---|---|
| Producer | NCM |
| CAN ID | A/B |
| Purpose | Accessory 1 Commands*** |
| Length | 8 |
| Consumers | VCM |
| Report Rate | Every 16 mS |

| Byte | Contents | Description | Units/Scaling |
|---|---|---|---|
| Byte 0 | Accy1 Cmd (LSB) | −32000 to +32000 | * |
| Byte 1 | Accy1 Cmd (MSB) | | |
| Byte 2 | Accy1 PGain (LSB) | 0 to +32000 | |
| Byte 3 | Accy1 PGain (MSB) | | |
| Byte 4 | Accy1 IGain (LSB) | 0 to +32000/0 command | |
| Byte 5 | Accy1 IGain (MSB) | resets integral | |
| Byte 6 | Reserved | | |
| Byte 7 | Reserved | | |

As illustrated, Table 13 identifies accessory command data that may be sent from the NCM 114 to the VCM 112 via the navigation control interface 116 when the vehicle in operating in automatic mode. The purpose of the message in Table 13 is to provide accessory commands to the VCM 112 when the vehicle 106 is operating in automatic mode. Accordingly, the NCM 114 may send an accessory command with bytes 0 and 1. The NCM 114 may send an accessory P gain with bytes 2 and 3. The NCM 114 may send an accessory I gain in bytes 4 and 5.

TABLE 14

NCM to VCM message type F

| | |
|---|---|
| Producer | NCM |
| CAN ID | A/B |
| Purpose | Accessory 2 Commands*** |
| Length | 8 |
| Consumers | VCM |
| Report Rate | Every 16 mS |

| Byte | Contents | Description | Units/Scaling |
|---|---|---|---|
| Byte 0 | Accy2 Cmd (LSB) | −32000 to +32000 | * |
| Byte 1 | Accy2 Cmd (MSB) | | |
| Byte 2 | Accy2 PGain (LSB) | 0 to +32000 | |
| Byte 3 | Accy2 PGain (MSB) | | |
| Byte 4 | Accy2 IGain (LSB) | 0 to +32000/0 command | |
| Byte 5 | Accy2 IGain (MSB) | resets integral | |
| Byte 6 | Reserved | | |
| Byte 7 | Reserved | | |

As illustrated, Table 14 identifies accessory command data for a second accessory on the vehicle 106 that may be sent from the NCM 114 to the VCM 112 via the navigation control interface 116 when the vehicle in operating in automatic mode. The purpose of the message in Table 14 is to provide accessory commands to the VCM 112 when the vehicle 106 is operating in automatic mode. Accordingly, the NCM 114 may send an accessory command with bytes 0 and 1. The NCM 114 may send an accessory P gain with bytes 2 and 3. The NCM 114 may send an accessory I gain in bytes 4 and 5.

TABLE 15

NCM to VCM message type G

| | |
|---|---|
| Producer | NCM |
| CAN ID | A/B |
| Purpose | Accessory 3 Commands*** |
| Length | 8 |
| Consumers | VCM |
| Report Rate | Every 16 mS |

| Byte | Contents | Description | Units/Scaling |
|---|---|---|---|
| Byte 0 | Accy3 Cmd (LSB) | −32000 to +32000 | * |
| Byte 1 | Accy3 Cmd (MSB) | | |
| Byte 2 | Accy3 PGain (LSB) | 0 to +32000 | |
| Byte 3 | Accy3 PGain (MSB) | | |
| Byte 4 | Accy3 IGain (LSB) | 0 to +32000/0 command resets integral | |
| Byte 5 | Accy3 IGain (MSB) | | |
| Byte 6 | Reserved | | |
| Byte 7 | Reserved | | |

As illustrated, Table 15 identifies accessory command data for a third accessory on the vehicle 106 that may be sent from the NCM 114 to the VCM 112 via the navigation control interface 116 when the vehicle is operating in automatic mode. The purpose of the message in Table 15 is to provide accessory commands to the VCM 112 when the vehicle 106 is operating in automatic mode. Accordingly, the NCM 114 may send an accessory command with bytes 0 and 1. The NCM 114 may send an accessory P gain with bytes 2 and 3. The NCM 114 may send an accessory I gain in bytes 4 and 5.

TABLE 16

NCM to VCM message type H

| | |
|---|---|
| Producer | NCM |
| CAN ID | A/B |
| Purpose | Accessory 4 Commands*** |
| Length | 8 |
| Consumers | VCM |
| Report Rate | Every 16 mS |

| Byte | Contents | Description | Units/Scaling |
|---|---|---|---|
| Byte 0 | Accy4 Cmd (LSB) | −32000 to +32000 | * |
| Byte 1 | Accy4 Cmd (MSB) | | |
| Byte 2 | Accy4 PGain (LSB) | 0 to +32000 | |
| Byte 3 | Accy4 PGain (MSB) | | |
| Byte 4 | Accy4 IGain (LSB) | 0 to +32000/0 command resets integral | |
| Byte 5 | Accy4 IGain (MSB) | | |
| Byte 6 | Reserved | | |
| Byte 7 | Reserved | | |

*Control mode dependent: Speed Mode: mm/s; Torque Mode: Nm; Position Mode: mm or degrees;
***Accessory Function Matrix is located in Table 17.

As illustrated, Table 16 identifies accessory command data for a fourth accessory on the vehicle 106 that may be sent from the NCM 114 to the VCM 112 via the navigation control interface 116 when the vehicle in operating in automatic mode. The purpose of the message in Table 16 is to provide accessory commands to the VCM 112 when the vehicle 106 is operating in automatic mode. Accordingly, the NCM 114 may send an accessory command with bytes 0 and 1. The NCM 114 may send an accessory P gain with bytes 2 and 3. The NCM 114 may send an accessory I gain in bytes 4 and 5.

TABLE 17 control accessories, dependent on type of vehicle

| Accessory Function Matrix | | ACCY 1 | ACCY 2 | ACCY 3 | ACCY 4 |
|---|---|---|---|---|---|
| First Type | Function | Reach | Tilt | Side Shift | |
| | Position Units | mm | Deg | mm | |
| | Speed Units | mm/sec | Deg/sec | mm/sec | |
| Second Type | Function | Traverse | Pivot | Ext/Tlt/Pos | Aux Mast |
| | Units | mm | Deg | mm/Deg/mm | mm |
| Third Type | Function | Tilt | Side Shift | Clamp | Tip |
| | Units | Deg | mm | mm | Deg |
| Fourth type | Function Units | | | | |

As illustrated in Table 17, depending on the type of vehicle and thus the accessories on that vehicle, the functions may change. As an example, if the vehicle 106 is a first type, the accessory functions may include a reach, tilt, and side shift. If the vehicle 106 is a second type, the accessory functions may include traverse, pivot, extend/tilt/position, and auxiliary mast. If the vehicle 106 is a third type, the accessory functions may include tilt, side shift, clamp, and tip. Accessories on vehicles 106 of a fourth type may include other functions.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising a navigation system and a vehicle, wherein:
    the vehicle comprises a traction system, a vehicle control module (VCM), a navigation control module (NCM), and a navigation control interface;
    the traction system comprises a traction control module and a traction motor;
    the VCM facilitates operator initiated control of the vehicle in a manual mode;
    the NCM causes the vehicle to implement an automatic control function by travelling to a predetermined destination and performing a desired task using the traction system upon receipt of an automatic command from the navigation system;
    the navigation control interface connects the VCM and the NCM to facilitate communication between the VCM and NCM;
    the VCM sends traction data to the NCM via the navigation control interface for implementing the automatic control function; and
    the traction data comprises traction speed feedback, traction speed limit, traction acceleration force limit, and traction deceleration force limit, or a combination thereof.

2. A system of claim 1, wherein the automatic command comprises at least one of the following: a plurality of path segments that directs the NCM to a predetermined destination and a coordinate of the predetermined destination.

3. A system of claim 1, wherein the VCM sends vehicle data to the NCM via the navigation control interface, wherein the vehicle data comprises at least one of the following: a vehicle identifier, a vehicle state, a vehicle status, a counter, and a load weight.

4. A system of claim 3, wherein the vehicle state is identified as at least one of the following: initialization, standby, manual, automatic, and an error.

5. A system of claim 3, wherein the vehicle status includes at least one of the following: a mode select switch state, a brake switch state, an automatic contactor state, a traction mode, a steering mode, a hoist mode, and accessory mode, and an error.

6. A system of claim 1, wherein the VCM sends steering data to the NCM via the navigation control interface and wherein the steering data comprises at least one of wheel angle feedback, a counterclockwise wheel angle limit, limit, and a wheel angle rate limit.

7. A system of claim 1, wherein the VCM sends hoist data to the NCM via the navigation control interface, wherein the hoist data comprises at least one of the following: a fork height, a hoist speed limit, a hoist acceleration limit, and a hoist height limit.

8. A system of claim 1, wherein the NCM sends the VCM at least one of the following via the navigation control interface: system data, traction command data, steering command data, hoist command data, and accessory command data.

9. A system of claim 1, wherein the NCM sends system data to the VCM via the navigation control interface, wherein the system data comprises at least one of the following: a system identifier, a navigation system state, a navigation system status, a counter, and a braking status.

10. A system of claim 1, wherein the NCM sends traction command data to the VCM via the navigation control interface, wherein the traction command data comprises at least one of the following: a traction command and a traction gain.

11. A system of claim 1, wherein the NCM sends hoist command data to the VCM via the navigation control interface, wherein the hoist command data comprises at least one of the following: a hoist command and a hoist gain.

12. A system of claim 1, wherein the NCM, the VCM, and the navigation control interface are part of a vehicle computing architecture on a forklift.

13. A system of claim 12, wherein the NCM receives automatic commands from the navigation system for navigating the forklift.

14. A system of claim 1, further comprising: a display, a traction control module (TCM), and a steering control module (SCM), wherein:
the display provides the operator with information regarding operation of the vehicle;
the TCM is implemented as a first motor controller that receives and implements at least one of the following: a power signal and a speed command; and
the SCM is implemented as a second motor controller that receives and implements a steering command.

15. A system of claim 14, further comprising a first can bus and a second can bus, wherein:
the first can bus provides a communication medium among the display, the VCM, the TCM, and the SCM; and
the second can bus is part of the navigation control interface that couples the VCM with the NCM and facilitates sending and receiving of data between the VCM and the NCM.

16. A system of claim 1, further comprising a remote computing device, wherein:
the remote computing device processes a work order, the work order identifying a location of a product that will be moved; and
the remote computing device determines whether the vehicle will perform the work order.

17. A system of claim 16, wherein the remote computing device comprises a server.

18. A vehicle comprising a vehicle control module (VCM), a navigation control module (NCM), a hardware interface, and a steering control system wherein:
the steering control system comprises a steering control module (SCM) and a steering motor;
the VCM facilitates operator initiated control of the vehicle in a manual mode;
the NCM causes the vehicle to implement an automatic control function by travelling to a predetermined destination and performing a desired task using the steering system upon receipt of an automatic command from a navigation system;
the NCM sends data related to the automatic command for implementing the automatic command;
the hardware interface connects the VCM and the NCM to facilitate communication of data between the VCM and NCM;
the VCM sends steering data to the NCM via the navigation control interface for implementing the automatic control function; and
the steering data comprises wheel angle feedback, a counterclockwise wheel angle limit, a clockwise wheel angle limit, a wheel angle rate limit, or a combination thereof.

19. A vehicle comprising a vehicle control module (VCM), a navigation control module (NCM), a hoist control system, and a hardware interface, wherein:
the hoist control system comprises a hoist control module and a hoist control motor;
the NCM causes the vehicle to implement an automatic control function by travelling to a predetermined destination and performing a desired task using the hoist control system upon receipt of an automatic command from a navigation system;
the NCM sends data related to an automatic command for implementing an automatic control function;
the hardware interface connects the VCM and the NCM to facilitate communication of data between the VCM and NCM;
the VCM sends hoist data to the NCM via the navigation control interface for implementing the automatic control function; and
the hoist data comprises a fork height, a hoist speed limit, a hoist acceleration limit, a hoist height limit, or a combination thereof.

20. A system comprising a navigation system and a vehicle with a vehicle control module (VCM), a navigation control module (NCM), an accessory control system, and a navigation control interface, wherein:
the vehicle comprises an accessory
the accessory control system comprises an accessory control module and an accessory control motor;
the NCM causes the vehicle to implement an automatic control function by travelling to a predetermined destination and performing a desired task using the accessory upon receipt of an automatic command from the navigation system;
the navigation control interface connects the VCM and the NCM to facilitate communication between the VCM and NCM for implementing the automatic control function and for reporting implementation of a manual mode;

the VCM sends accessory data to the NCM via the navigation control interface for implementing the automatic control function of an accessory of the vehicle; and the accessory data comprises a first accessory position, a second accessory position, an accessory upper limit, and an accessory lower limit, or a combination thereof.

\* \* \* \* \*

UNITED STATES PATENT AND TRADEMARK OFFICE
CERTIFICATE OF CORRECTION

PATENT NO.        : 9,002,626 B2                                   Page 1 of 1
APPLICATION NO.   : 14/172185
DATED             : April 7, 2015
INVENTOR(S)       : Lucas B. Waltz et al.

It is certified that error appears in the above-identified patent and that said Letters Patent is hereby corrected as shown below:

In the Claims

Col. 16, Claim 1, Line 59,
 "tion speed limit, traction acceleration force limit, and" should read
 --tion speed limit, traction acceleration force limit,--; and Col. 17, Claim 5, Line 10,
 "mode, a steering mode, a hoist mode, and accessory mode," should read
 --mode, a steering mode, a hoist mode, an accessory mode,--.

Signed and Sealed this
Twenty-second Day of March, 2016

Michelle K. Lee
*Director of the United States Patent and Trademark Office*